United States Patent [19]
Takamatsu

[11] Patent Number: 6,131,153
[45] Date of Patent: Oct. 10, 2000

[54] MULTIPROCESSOR SYSTEM HAVING A PLURALITY OF GATEWAY UNITS AND WHEREIN EACH GATEWAY UNIT CONTROLS MEMORY ACCESS REQUESTS AND INTERFERENCES FROM ONE HIERCHICAL LEVEL TO ANOTHER

[75] Inventor: Hajime Takamatsu, Tokyo, Japan

[73] Assignee: NKK Corporation, Japan

[21] Appl. No.: 08/817,934

[22] PCT Filed: Oct. 31, 1995

[86] PCT No.: PCT/JP95/02232

§ 371 Date: Jul. 11, 1997

§ 102(e) Date: Jul. 11, 1997

[87] PCT Pub. No.: WO96/13779

PCT Pub. Date: Sep. 5, 1996

[30] Foreign Application Priority Data

Oct. 31, 1994 [JP] Japan ..................................... 6-290622

[51] Int. Cl.[7] ..................................... G06F 15/16
[52] U.S. Cl. .................. 712/28; 712/29; 712/34
[58] Field of Search .................. 395/800.29, 800.32, 395/800.01, 800.34; 712/28, 32, 34, 1, 35

[56] References Cited

U.S. PATENT DOCUMENTS

| | | | |
|---|---|---|---|
| 4,228,496 | 10/1980 | Katzman et al. | 395/308 |
| 5,241,641 | 8/1993 | Iwasa et al. | 711/122 |
| 5,553,240 | 9/1996 | Madduri | 395/200.55 |
| 5,689,679 | 11/1997 | Jouppi | 711/122 |

FOREIGN PATENT DOCUMENTS

| | | |
|---|---|---|
| 2-217941 | 8/1990 | Japan . |
| 6-119368 | 4/1994 | Japan . |

*Primary Examiner*—Meng-Ai T. An
*Assistant Examiner*—Mackly Monestime
*Attorney, Agent, or Firm*—Nixon & Vanderhye

[57] ABSTRACT

In order to obtain a multiprocessor system capable of increasing the number of data processors without changing an operating system program, a multiprocessor system includes a main memory (7) which stores an application program and an operating system program, a plurality of data processors (3–6) each including at least one data processor to perform distributed processing of the application program in accordance with the operating system program, a plurality of system buses (1A–1E) connected between the plurality of data processors (3–6) and the main memory (7), and a plurality of gateway units (2A–2E) inserted in the system buses (1A–1E) to set a hierarchical order of the main memory (7) and the plurality of data processors (3–6) using the main memory as a highest hierarchical level and allow data transmission between the hierarchical levels, each of the plurality of gateway units being arranged to monitor memory access requests from hierarchical levels lower than a corresponding hierarchical level and control to hold the memory access request when the memory access request interferes with memory access from the corresponding hierarchical level.

13 Claims, 4 Drawing Sheets

MULTIPROCESSOR SYSTEM HAVING A PLURALITY OF GATEWAY UNITS AND WHEREIN EACH GATEWAY UNIT CONTROLS MEMORY ACCESS REQUESTS AND INTERFERENCES FROM ONE HIERCHICAL LEVEL TO ANOTHER

TECHNICAL FIELD

The present invention relates to a multiprocessor system constituted by a plurality of data processors.

BACKGROUND ART

In recent years, the performance of a data processor has greatly advanced along with improvements in mainly a manufacturing process, an architecture, and the like. As a result, strong demand has arisen for advanced data processing using data processors. To meet this demand, the high-speed operation of the data processor has been requested. On the other hand, the improvements in a manufacturing process, an architecture, and the like have almost limitations, and an increase in cost due to these improvements cannot be neglected. Therefore, the development of a data processor itself is getting difficult.

Under these circumstances, a multiprocessor system is proposed by combining existing data processors. In a conventional multiprocessor system, desired data processing is distributed to and executed in a plurality of data processors connected through a single system bus constituted by an address bus, a data bus, a control bus, and the like, thereby shortening the total processing time.

In the conventional multiprocessor system, the plurality of data processors have a parallel relationship in which the system bus is shared by these data processors. For this reason, scheduling for determining the processing order of the processors must be so performed as to efficiently use the system bus by assigning to these data processors a plurality of task sets obtained by dividing the desired data processing. This scheduling is performed using an operating system inherent to the multiprocessor system.

The above multiprocessor system has the following drawback when the development of application software is restricted by the limitation of the system capacity. That is, the limitation of the system capacity can be widened when the number of processors increases. The increase in the number of processors changes the scheduling environment, requiring a new operating system program. In addition, this new operating system program often disables execution of part of existing application software. In this case, the part of the application software must be rewritten to match the new operating system program. Therefore, the expansion of the system capacity is difficult except a special application which need not consider efficient utilization of software resources.

It is an object of the present invention to provide a multiprocessor system capable of increasing the number of data processors without changing an operating system program.

DISCLOSURE OF INVENTION

According to the present invention, there is provided a multiprocessor system comprising a main memory unit for storing an application program and an operating system program, a plurality of processor units each including at least one data processor to perform distributed processing of the application program in accordance with the operating system program, a plurality of system buses connected between the plurality of processor units and the main memory unit, and a plurality of gateway units inserted in the system buses to set a hierarchical order of the main memory unit and the plurality of processor units using the main memory unit as a highest hierarchical level and allow data transmission between the hierarchical levels, the plurality of gateway units each being arranged to monitor memory access requests from hierarchical levels lower than a corresponding hierarchical level and control to hold the memory access request when the memory access request interferes with memory access from the corresponding hierarchical level.

In this multiprocessor system, the plurality of gateway units are inserted in the system buses to set a hierarchical order of the main memory unit and the plurality of processor units using the main memory unit as a highest hierarchical level and allow data transmission between the hierarchical levels, and each of the plurality of gateway units is arranged to monitor memory access requests from hierarchical levels lower than a corresponding hierarchical level and control to hold the memory access request when the memory access request interferes with memory access from the corresponding hierarchical level. Under this control, each processor unit can access the main memory unit through a system bus prepared therefor without interfering with memory access from a higher hierarchical data processor. In this case, the operating system program need not perform conventional scheduling. Therefore, when the maximum number of hierarchical levels is preset in the operating system program, the number of processor units can be changed within the preset number of hierarchical levels without changing the operating system program.

BEST MODE OF CARRYING OUT THE INVENTION

A multiprocessor system according to an embodiment of the present invention will be described below with reference to the accompanying drawings.

Figure 1:
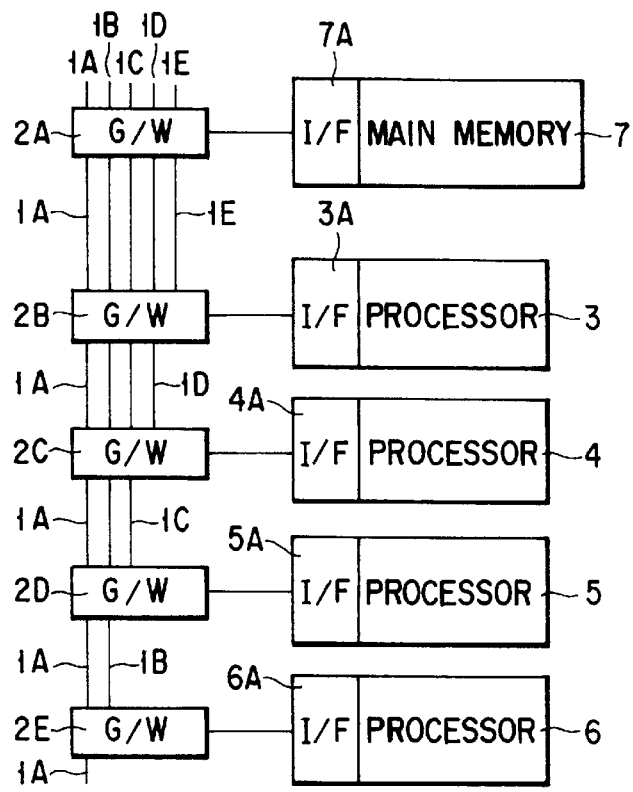
FIG. 1 is a block diagram of a multiprocessor system according to an embodiment of the present invention.

FIG. 1 is a block diagram of this multiprocessor system. This multiprocessor system comprises system buses 1A to 1E, gateway units 2A to 2E, data processors 3 to 6, and a main memory 7. The system buses 1B to 1E are prepared in a one-to-one correspondence with the data processors 3 to 6. The system buses 1A to 1E include address signal lines, data signal lines, control signal lines, and the like and can transmit data independently as in a conventional system bus. The main memory 7 is used to store the application program, the operating system program, and the like. The data processors 3 to 6 are used to perform distributed processing of the application program under the control of the operating system program. The data processors 3 to 6 and the main memory 7 have intelligent interface units 3A, 4A, 5A, 6A, and 7A for managing the inputs and outputs with respect to the data processors 3 to 6 and the main memory 7.

The gateway units 2A to 2E are inserted in the system buses 1A to 1E to set the hierarchical order of the main memory 7 and the data processors 3 to 6 using the main memory 7 as the highest hierarchical level and allow data transmission between the respective hierarchical levels. More specifically, the gateway unit 2A is connected to the main memory 7 and to the gateway unit 2B through the system buses 1A to 1E assigned to the lower hierarchical levels than that of the main memory 7. The gateway unit 2B is connected to the data processor 3 and to the gateway unit 2C through the system buses 1A to 1D assigned to the lower hierarchical levels than that of the data processor 3. The gateway unit 2C is connected to the data processor 4 and to the gateway unit 2D through the system buses 1A to 1C assigned to the lower hierarchical levels than that of the data processor 4. The gateway unit 2D is connected to the data processor 5 and to the gateway unit 2E through the system buses 1A and 1B assigned to the lower hierarchical levels than that of the data processor 5. The gateway unit 2E is connected to the data processor 6 and the system bus 1A. Each of the gateway units 2A to 2E monitors a memory access request from hierarchical levels lower than the corresponding hierarchical level. When the memory access request interferes with a memory access of the corresponding hierarchical level, each of the gateway units 2A to 2E holds this memory access request.

Figure 2:
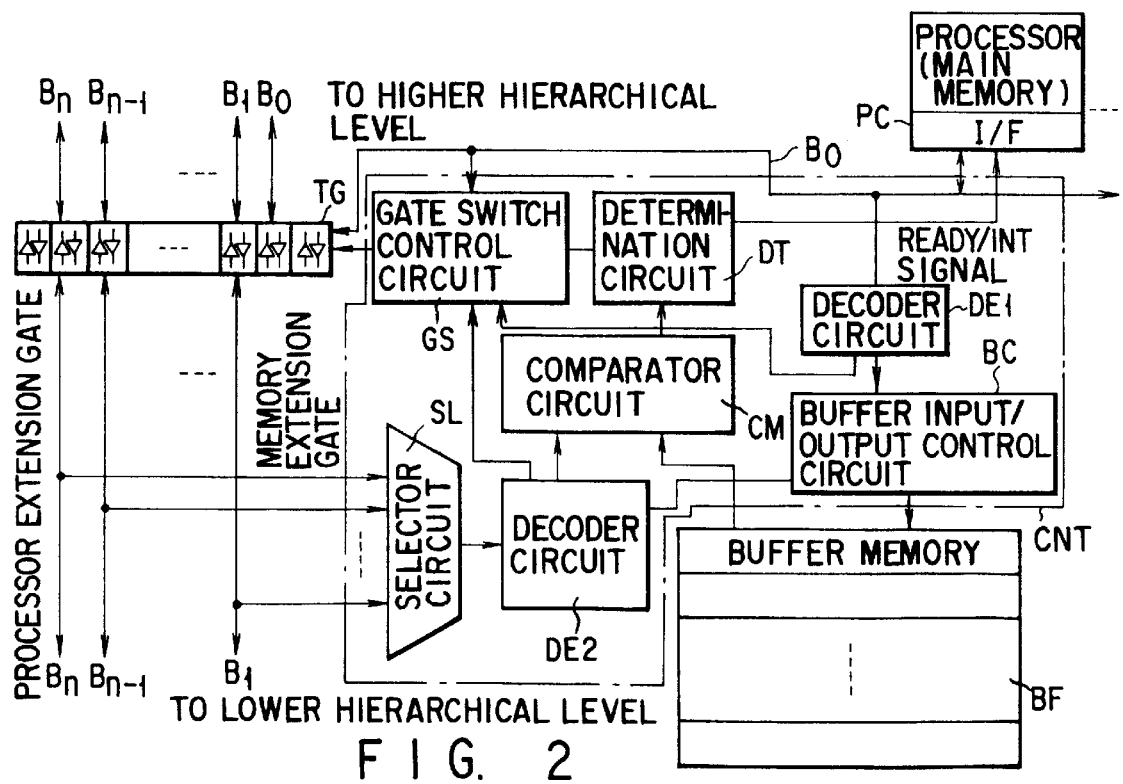
FIG. 2 is a block diagram showing the arrangement of each gateway unit shown in FIG. 1.
Figure 3:
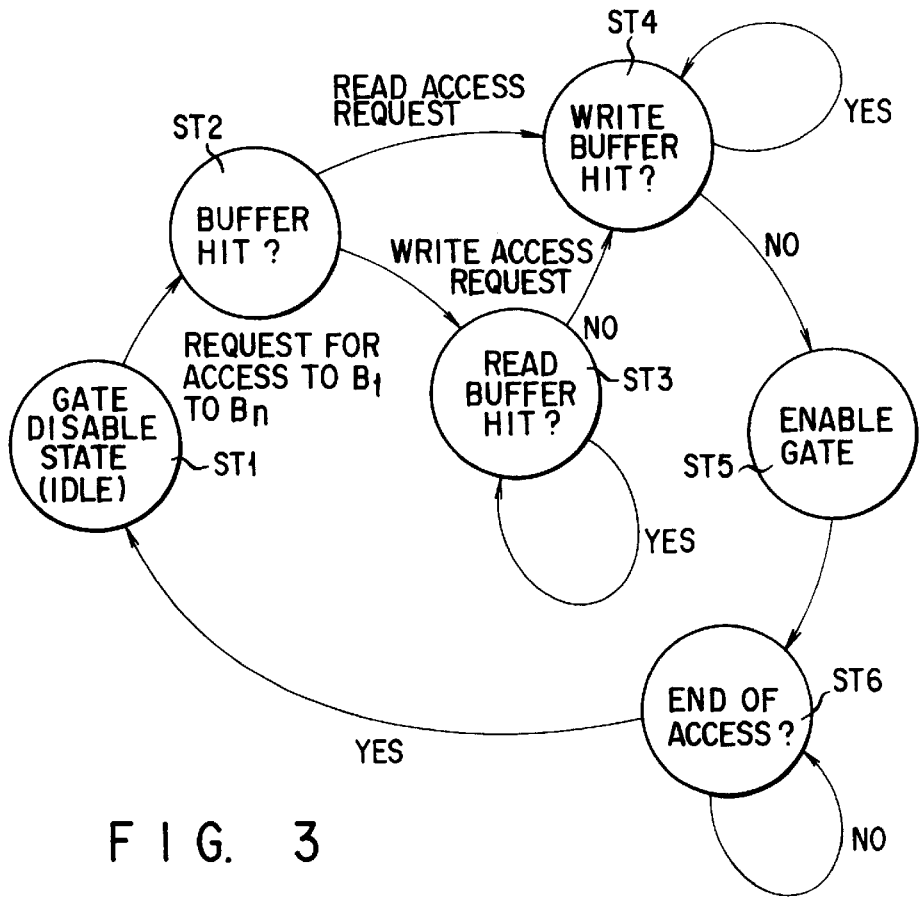
FIG. 3 is a view showing state transition of the operation of the gateway unit shown in FIG. 2.

FIG. 2 shows the arrangement of each of the gateway units 2B to 2E shown in FIG. 1. FIG. 3 shows the arrangement of the gateway unit 2A. The number of system buses connected to these gateway units decreases when the hierarchical level is lower. In FIGS. 2 and 3, system buses B0 to Bn where n represents the number of buses are shown in place of the system buses 1A to 1E.

Each gateway unit comprises transmission gates TG for gating the system buses B0 to Bn, a buffer memory BF for holding memory access information of the corresponding hierarchical level, and a control circuit CNT for collating the memory access requests supplied from the lower hierarchical levels to the system buses B1 to Bn with the contents of the buffer memory BF and controlling the transmission gates TG on the basis of the collation result. The control circuit CNT controls to interrupt the operation of a corresponding hierarchical processor PC (i.e., the processor 3, 4, 5, or 6 shown in FIG. 1) in e.g., flashing of the buffer memory BF and any other exceptional operation. The processor PC transfers data to a higher hierarchical level through the system bus B0 and to lower hierarchical levels through the system buses B1 to Bn.

Note that the processor PC and the main memory 7 are connected to the transmission gates TG through the system bus B0 (a bus illustrated in the horizontal direction). The transmission gates TG connect the system buses B1 to Bn connected to the higher hierarchical level with the system buses B1 to Bn connected to the lower hierarchical level. Further, the transmission gates TG are used to selectively connect the system bus B0 of the highest hierarchical level with one of the system buses B1 to Bn connected to a lower hierarchical level, and to selectively connect the system bus B0 of a hierarchical level other than the highest hierarchical level with the system bus B0 (a bus illustrated in the vertical direction) connected to a higher hierarchical level. The system bus 1A is arranged to add the lowest hierarchical level. In addition, the transmission gates TG have expansion gates for adding processors and a main memory. The system buses 1A to 1E extending upward from the gateway 2A are used when a main memory is added.

The control circuit CNT has a decoder circuit DE1, a buffer input/output control circuit BC, a selector circuit SL, a decoder circuit DE2, a comparator circuit CM, a determination circuit DT, and a gate switch control circuit GS. The decoder circuit DE1 decodes a bus signal supplied from the system bus B0 in the corresponding hierarchical level to detect a memory access request. This memory access request is constituted by address, data, and access form signals. The buffer input/output control circuit BC sequentially stores or updates in the buffer memory BF memory access information corresponding to the memory access request from the decoder circuit DE1. The memory access information is constituted by address information AD representing an address accessed in the main memory 7, access form information R/W representing one of a write or read operation, access count information N representing the number of times of data access, and valid flag information V representing one of valid and invalid states of the memory access information. The buffer input/output control circuit BC updates the contents of the buffer memory BF so as to reflect the access situation. The selector circuit SL is connected to the system buses B1 to Bn on a lower hierarchical side of the transmission gates TG and selectively extracts a bus signal from the system buses B1 to Bn. The decoder circuit DE2 decodes a bus signal selectively extracted the selector circuit SL to detect a memory access request. This memory access request is constituted by address, data, and access form signals. The memory access request is supplied to the comparator circuit CM. The address signal of the memory access request is also supplied to the buffer input/output control circuit BC. The buffer input/output control circuit BC reads out memory access information from the buffer memory BF in correspondence with the address signal from the decoder circuit DE2 and supplies the readout memory access information to the comparator circuit CM. The comparator circuit CM collates the memory access request from the decoder circuit DE2 with the memory access information from the buffer memory BF. The determination circuit DT receives a collation result from the comparator circuit CM and determines whether the memory access request is approved according to the collation result. The gate switch control circuit GS controls gating and the transmission direction of the transmission gates TG on the basis of a determination result from the determination circuit DT. More specifically, when the collation result has the contents of approving the memory access, a transmission gate TG is opened to a specified transmission direction in a specified system bus according to the memory access request. The gate switch control circuit GS controls gating and the transmission direction of the transmission gates TG in accordance with control of the processor PC of the corresponding hierarchical level through the decoder circuit DE1 and interfacing of the processor PC (or main memory 7). This interfacing is performed to obtain information associated with gating of the transmission gates TG from the gate switch control circuit GS. Note that the determination circuit DT normally enables or disables the operation of the processor PC (or main memory 7) of the corresponding hierarchical level by supplying a ready signal READY and allow the exceptional operation of the processor PC by supplying an interrupt signal INT when collation is not executable due to flashing of the buffer memory BF or any other special operation.

The decoder circuit DE2 is connected to the gate switch control circuit GS to supply a signal for freely transmitting a bus signal of accessing an expansion memory when the memory is expanded.

The gateway unit is operated in response to a memory access request from the lower hierarchical level, as shown in FIG. 3. More specifically, the gateway unit is initially set in an idle state ST1 in which the transmission gates TG are kept closed. When a memory access request is supplied to one of the system buses B1 to Bn, the state of the gateway unit is shifted to a state ST2. In the state ST2, it is checked whether the memory access request has hit the memory access information of the corresponding address in the buffer memory BF. If the access form of the memory access request is a write access, the state of the gateway unit is shifted to a state ST3. In this state ST3, it is checked whether this request has hit the read memory access information in the buffer memory BF. If the access form of this memory access request is read access, the state of the gateway unit is shifted to a state ST4. In this state ST4, it is checked whether the memory access request has hit the write memory access information in the buffer memory BF. The state ST3 continues until a hit to the information in the buffer memory BF is confirmed. When the hit state is no longer confirmed, the state ST3 is shifted to a state ST4. This state ST4 continues until a hit to the information in the buffer memory BF is confirmed. If the hit to the information is no longer confirmed, the state ST4 is shifted to a state ST5. In the state ST5, a transmission gate TG is enabled. When the transmission gate TG is enabled, the state of the gateway unit is shifted to a state ST6. In this state ST6, the end of memory access is checked. The gateway unit is kept in the state ST5 until memory access is accessed. When the end of this memory access is confirmed, the state returns to the state ST1.

Figure 4:
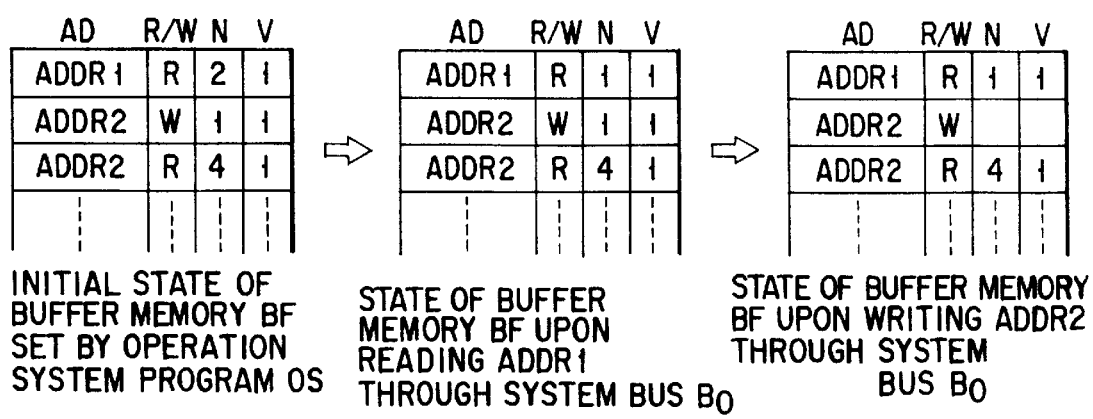
FIG. 4 is a view showing a change in memory access information in a buffer memory shown in FIG. 2.

FIG. 4 shows a change in memory access information in the buffer memory BF.

Assume that the buffer memory BF initially stores memory access information as indicated by the left memory map. When the processor PC read-accesses a memory address ADDR1 through the system bus B0, the access count information N of the memory access information corresponding to the memory address ADDR1 changes from "2" to "1", as indicated in the central memory map. When the processor PC write-accesses a memory address ADDR2 through the system bus B0, the access count information N of the memory access information corresponding to the memory address ADDR2 changes from "1" to "0", as shown in the right memory map. In this case, since memory access information is no longer required, the valid flag information V changes from "1" to "0". When the valid flag information V is set at "0", the corresponding memory access information is made invalid.

The control circuit CNT collates the contents of the buffer memory BF which change as described above upon supply of a memory access request from the processor PC to the system bus B0 with memory access requests supplied from lower hierarchical levels to the system buses B1 to Bn, and controls the transmission gates TG on the basis of the collation results.

A case in which a main memory is added will be supplementarily described. When a processor of a particular hierarchical level accesses the main memory 7, and a processor of a hierarchical level lower than the particular hierarchical level outputs an access request for the main memory, the transmission gate TG of the particular hierarchical level can directly transmit the request from the processor of lower hierarchical level to a higher hierarchical level because the processor of given hierarchical level does not collide with the processor of lower hierarchical level on the system buses. For this reason, the decoder circuit DEC2 discriminates an address signal assigned to the additional main memory with an address signal assigned to the existing main memory 7 and outputs a trigger signal for connecting to the higher hierarchical level the system bus connected to the lower hierarchical level which has requested access to the additional main memory. The gate switch circuit GS opens the gate of the corresponding bus in response to this trigger signal. The determination circuit DT also has a function of opening the gate for a specific system bus in response to the trigger signal generated by the decoder circuit DE2.

Figure 5:
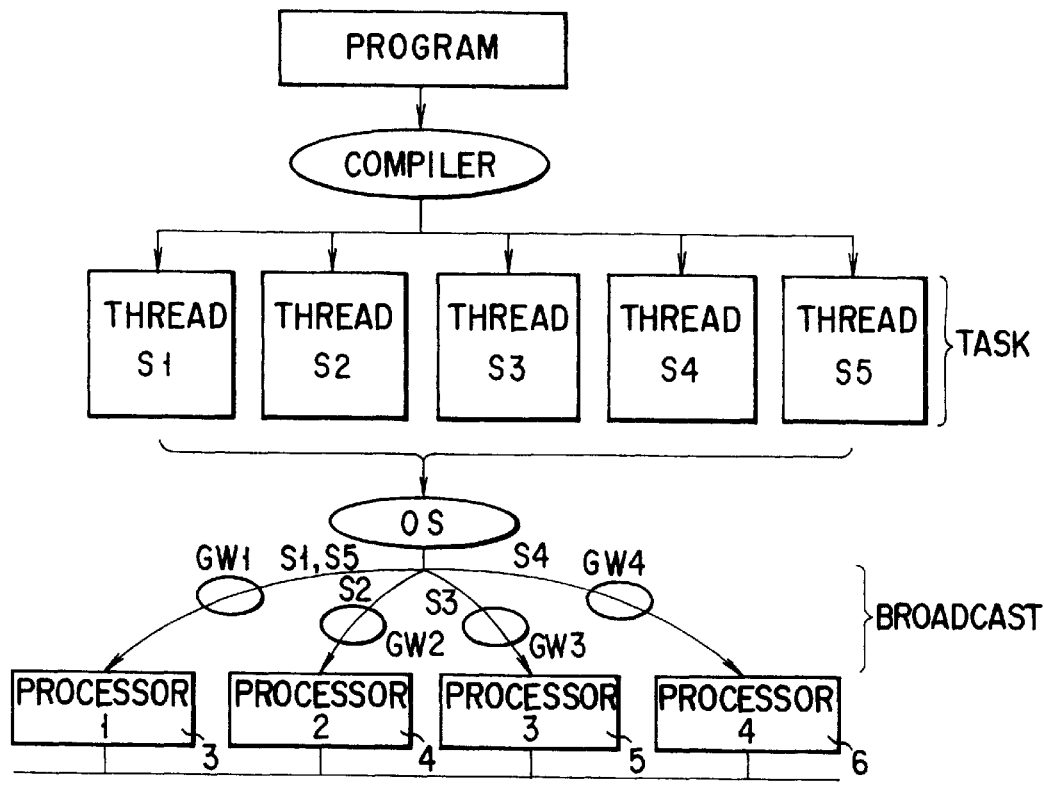
FIG. 5 is a view for explaining the role of an operating system program stored in a memory shown in FIG. 1.

FIG. 5 shows the role of an operation system program. A programmer creates an application program and decomposes the application program into a plurality of task sets (e.g., threads S1 to S5) using a compiler. The programmer then stores an application program composed of these threads S1 to S5 in the main memory 7. The threads S1 to S4 of the application program are broadcast to the data processors 3, 4, 5, and 6 through a group GW1 of the gateway units 2A and 2B, a group GW2 of the gateway units 2A to 2C, a group GW3 of the gateway units 2A to 2D, and a group GW4 of the gateway units 2A to 2E. The thread S5 is supplied to the data processor 3 similarly after processing of the thread S1.

In the arrangement shown in FIG. 1, the processor 3 has the access right of highest priority for the main memory 7. Access to the main memory 7 by the processor 4 requires permission of the gateway 2B of the hierarchical level corresponding to the processor 3. Access to the main memory 7 by the processor 5 requires permission of the gateways 2B and 2C of the hierarchical levels corresponding to the processors 3 and 4. Access to the main memory 7 by the processor 6 requires permission of gateways 2B, 2C, and 2D of the hierarchical levels corresponding to the processors 3, 4, and 5.

The hierarchical level of the processor 3 will be taken as an example. Whether the gateway 2B permits access for the processor 4, 5, or 6 of the hierarchical level lower than that of the processor 3 must be determined by processing of collating the memory access state of the processor 3 with the memory access request from the processor 4, 5, or 6 of the hierarchical level lower than that of the processor 3. The memory access information in the buffer memory BF is used as a reference for this processing. The memory access request from the processor 4, 5, or 6 of the hierarchical level lower than that of the processor 3 is supplied to the comparator circuit CM through a corresponding one of the system buses 1D, 1C, and 1B, the selector circuit SL, and the decoder circuit DEC2 and compared with the contents in the buffer memory BF. The comparison result is determined by the determination circuit DT. This determination result is output to the processor 3 as a READY/INT signal and to the gate switch control circuit GS as a gate enable/disable signal. By the way, the address of the memory access request from the decoder circuit DEC2 is used in the buffer input/output control circuit BC to read out the contents of the buffer memory BF.

The memory access information in the buffer memory BF is generated in correspondence with a memory access request output to the system bus B0 from the processor 3 operated under the control of an operating system program OS. The processor 3 accesses a higher hierarchical level, i.e., the main memory 7 normally through the system bus B0.

Exceptionally, when the processor 3 is required to positively control the transmission gates TG, the decoder circuit DE1 controls the gate switch control circuit GS on the basis of the request output from the processor 3 onto the system bus B0. In the gateway unit of highest hierarchical level, only one of the system buses B1 to Bn is connected to the system bus B0 to reliably prevent collision between the system buses.

A function of the operating system program OS which is associated with address partitioning setup of the main memory will be supplementarily described. The program OS holds address partitioning information for the main memory. The program OS can also hold address partitioning information for an additional main memory to prepare for expansion of the main memory. The address partitioning information is set in accordance with the maximum number of additional main memories.

The interface functions added to the main memory 7 and the processors 3 to 6 will be supplementarily described. According to the first function of the interface, the number of active system buses connected to the transmission gates TG on the higher hierarchical side and the number of active system buses on the lower hierarchical side are obtained from the gate switch control circuit GS and compared with each other. The hierarchical level to which the interface belongs is determined to be the higher, intermediate, or lower hierarchical level in the entire system on the basis of the comparison result. The second function is to determine the connection direction of the system bus B0 of a hierarchical level to which the interface belongs. (For connection to a system bus of lower or higher hierarchical level) As for an interface 7A of highest hierarchical level, the system bus B0 must always be connected to a lower hierarchical level. That is, the system bus B0 which connects the interface 7A and the transmission gate TB is connected to one of the system buses B1 to Bn on the lower hierarchical side and is separated from the system bus B0 on the higher hierarchical side. The system bus B0 for connecting an interface 3A, 4A, 5A, or 6A of lowest or intermediate hierarchical level to the transmission gate TB is connected to the system bus B0 of highest hierarchical level. In this manner, each interface detects the hierarchical order of the corresponding hierarchical level and outputs a gating instruction for the transmission gate TG to the gate switch control circuit GS. The hierarchical order is detected as follows. Assume that the number of active system buses on the higher hierarchical side is N(BU) and the number of active system buses on the lower hierarchical side is N(BL). If N(BU)=0, then the highest hierarchical level is detected. If N(BU)≠0 and N(BU)=N(BL), then an intermediate hierarchical level (memory) is detected. If N(BU)=0 and N(BU)>N(BL), then an intermediate hierarchical level (processor) is detected.

As described above, when the data processors 3, 4, 5, and 6 share the main memory 7 and perform distributed processing of the application program, a load on each data processor can be reduced.

According to this embodiment, the gateway units 2A to 2E are inserted in the system buses 1A to 1E to set a hierarchical order of the main memory 7 and the data processors 3 to 6 using the main memory 7 as a highest hierarchical level and allow data transmission between the hierarchical levels, and each of the gateway units 2A to 2E is arranged to monitor memory access requests from hierarchical levels lower than a corresponding hierarchical level and control to hold the memory access request when the memory access request interferes with memory access from the corresponding hierarchical level. Under this control, each processor unit can access the main memory 7 through a system bus prepared therefor without interfering with memory access from a higher hierarchical data processor. In this case, the operating system program need not perform conventional scheduling. Therefore, when the maximum number of hierarchical levels is preset in the operating system program, the number of processor units can be changed within the preset number of hierarchical levels without changing the operating system program.

Note that the highest hierarchical level is constituted by the main memory 7 in the above embodiment, but may be constituted by a main memory and a processor.

Figure 6:
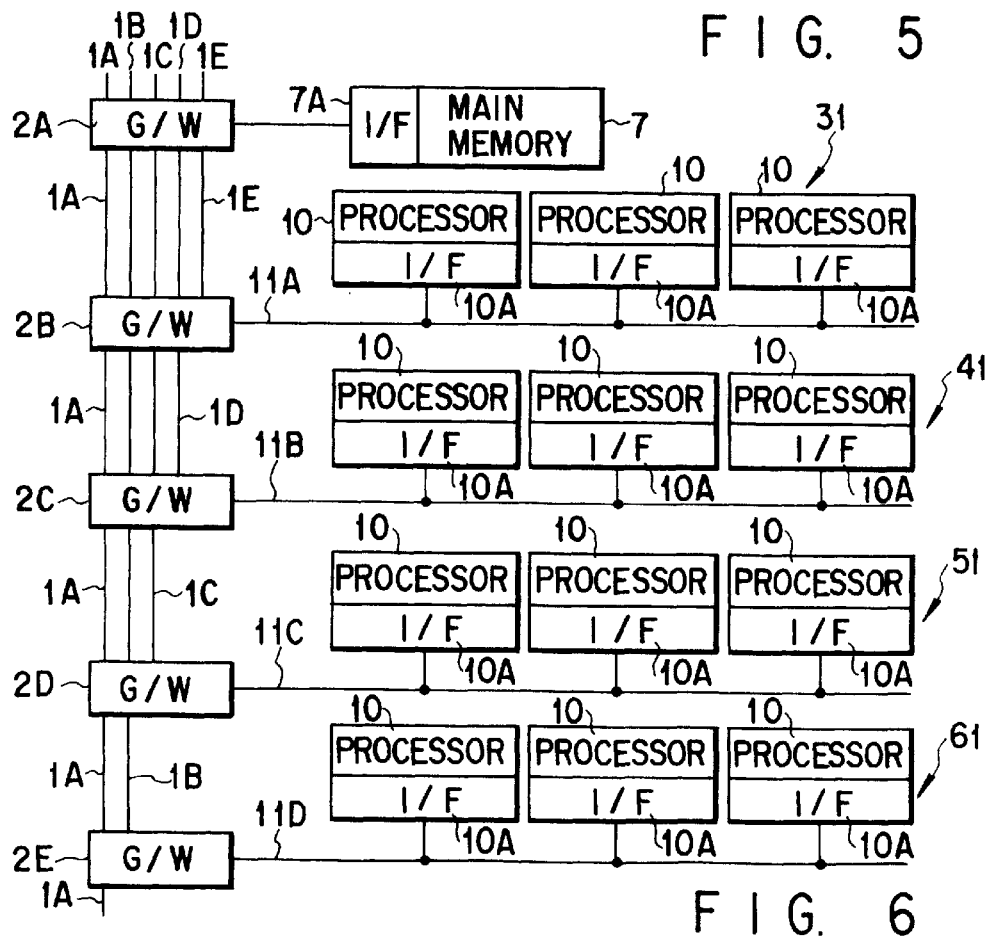
FIG. 6 is a view showing a modification of the multiprocessor system shown in FIG. 1.

FIG. 6 shows a modification of the multiprocessor system shown in FIG. 1. In this modification, processor groups 31, 41, 51, and 61 are arranged in place of the data processors 3, 4, 5, and 6 shown in FIG. 1. The gateway units 2A to 2E are connected to the processor groups 31, 41, 51, and 61 through subsystem buses 11A to 11D. Each of the processor groups 31, 41, 51, and 61 includes three data processors 10 each having an interface unit 10A. The processor groups 31, 41, 51, and 61 are identical to each other. The three data processors 10 of the processor group 31 are connected to each other through the subsystem bus 11A. The three data processors 10 of the processor group 41 are connected to each other through the subsystem bus 11B. The three data processors 10 of the processor group 51 are connected to each other through the subsystem bus 11C. The three data processors 10 of the processor group 61 are connected to each other through the subsystem bus 11D.

This modification obtains the same effect as in the above embodiment. In each of the processor groups 31, 41, 51, and 61, the three data processors share a corresponding one of the subsystem buses 11A to 11D. For this reason, an operating system program must perform scheduling for effectively utilizing the subsystem buses 11A to 11D. However, since this scheduling does not depend on the number of hierarchical levels, the operating system program need not be changed even with an increase in the number of data processors upon an increase in the number of hierarchical levels.

Figure 7:
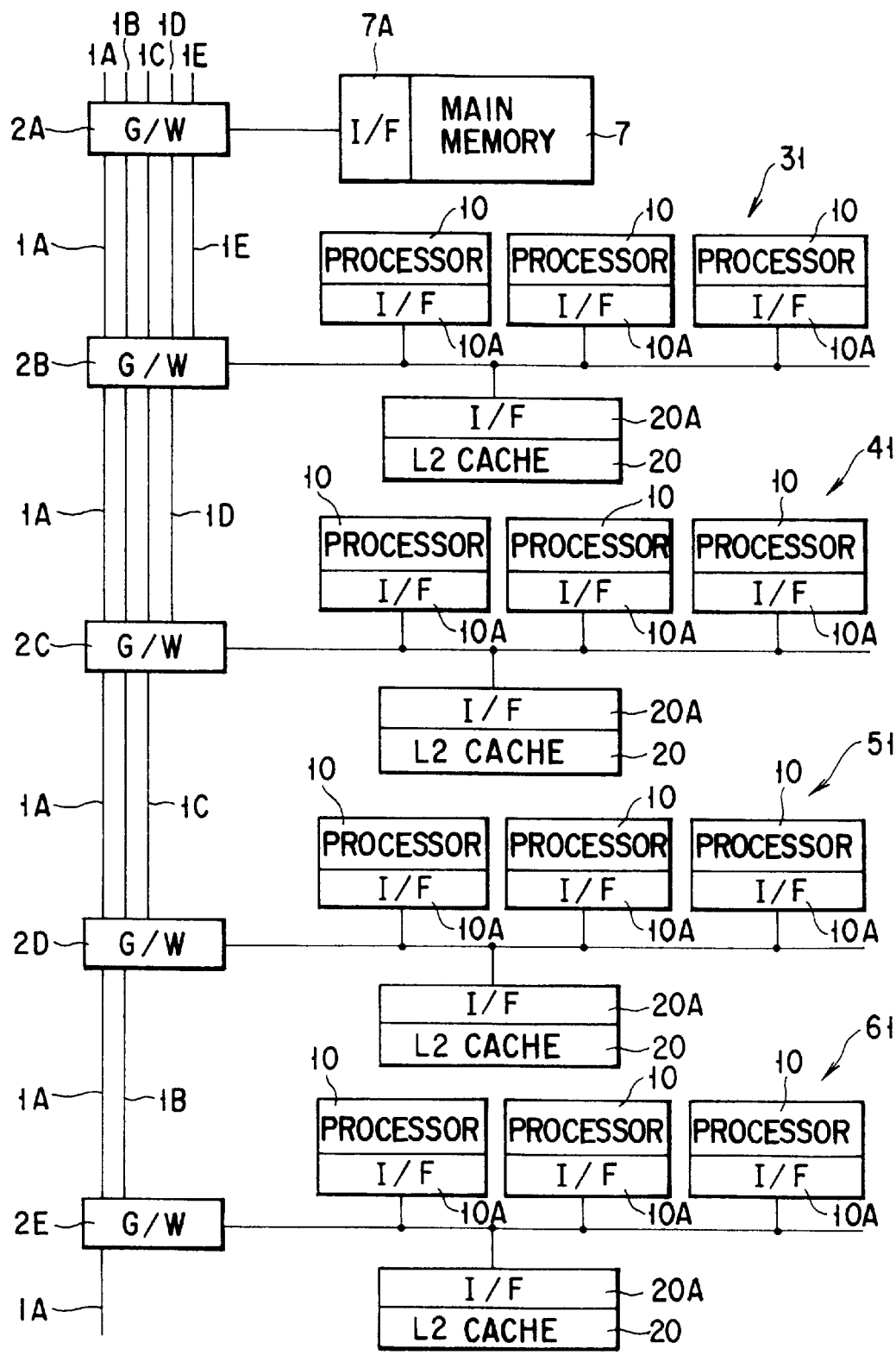
FIG. 7 is a view showing a modification of the multiprocessor system shown in FIG. 6.

FIG. 7 shows a modification of the multiprocessor system shown in FIG. 6. In this modification, the processor groups 31, 41, 51, and 61 comprise secondary cache memories 20, respectively. The secondary cache memories 20 have interface units 20A and are connected to the subsystem buses 11A to 11D, respectively. The same effect as in the modification shown in FIG. 6 can be obtained in the modification in FIG. 7.

INDUSTRIAL APPLICABILITY

As has been described above, in a multiprocessor system of the present invention, the number of data processors can be increased without changing an operating system program.

I claim:

1. A multiprocessor system comprising a main memory unit for storing an application program and an operating system program, a plurality of processor units each including at least one data processor to perform distributed processing of the application program in accordance with the operating system program, a plurality of system buses connected between said plurality of processor units and said main memory unit, and a plurality of gateway units inserted in said system buses to set a hierarchical order of said main memory unit and said plurality of processor units using said main memory unit as a highest hierarchical level and to allow data transmission between the hierarchical levels, said plurality of gateway units each being arranged to monitor memory access requests from hierarchical levels lower than a corresponding hierarchical level and control to hold the memory access request when the memory access request interferes with memory access from the corresponding hierarchical level;

wherein each of said gateway units comprises transmission gates for gating, of the plurality of system buses, system buses of a hierarchical level lower than a corresponding one of the hierarchical levels, a buffer memory for holding memory access information of the corresponding hierarchical level, and a control circuit for collating a memory access request supplied from a lower hierarchical level to the system bus of lower hierarchical level with contents of said buffer memory, and controlling said transmission gates on the basis of this collation result;

said control circuit comprising first detection means for detecting a memory access request from a bus signal supplied to the system bus of corresponding hierarchical level, second detection means for selectively extracting a bus signal from the system bus of lower hierarchical level on a hierarchical side lower than that of said transmission gates and detecting a memory access request from the detected bus signal, buffer management means for sequentially storing memory access information corresponding to memory access information corresponding to the memory access request obtained from said first detection means and reading out from said buffer memory memory access information corresponding to the memory access request obtained from said second detection means, and gate control means for collating the memory access request from said second detection means with the memory access information read out from said buffer memory and controlling gating and a transmission direction of said transmission gates on the basis of this collation result.

2. A multiprocessor system according to claim 1, wherein the memory access information stored in said buffer memory is constituted by address information representing an address accessed in said main memory unit, access from information representing one of a write operation to said main memory unit and a read operation from said main memory unit, access count information representing the number of times of data access, and valid flag information representing one of validness and invalidness of the memory access information.

3. A multiprocessor system according to claim 1, wherein said gate control means comprises interrupt means for selectively interrupting an operation of a processor unit of corresponding hierarchical level on the basis of an operating state of said buffer management means.

4. A multiprocessor system according to claim 1, wherein said plurality of processor units are identical to each other.

5. A multiprocessor system according to claim 4, wherein each of said processor units includes a plurality of data processors and a subsystem bus commonly connected to said plurality of data processors.

6. A multiprocessor system according to claim 5, wherein said each processor unit further includes a cache memory connected to said subsystem bus.

7. A multiprocessor system according to claim 1, wherein said transmission gates have expansion gates for adding hierarchical levels.

8. A gateway arranged in a corresponding hierarchical level and comprising transmission gates for controlling connection of a system bus of corresponding hierarchical level arranged in correspondence with the corresponding hierarchical level, a system bus of lower hierarchical level arranged in correspondence with a hierarchical level lower than the corresponding hierarchical level, and a system bus of higher hierarchical level arranged in correspondence with a hierarchical level higher than the corresponding hierarchical level, a buffer memory for holding memory access information of corresponding hierarchical level, and a control circuit for collating a memory access request supplied from the lower hierarchical level to at least one system bus of lower hierarchical level with memory access information held in said buffer memory and controlling said transmission gates on the basis of this collation result, wherein said control circuit comprises first detection means for detecting a memory access request from a bus signal supplied to said system bus of corresponding hierarchical level, second detection means for extracting a bus signal from said system bus of lower hierarchical level to detect a memory access request from the bus signal, buffer management means for sequentially storing memory access information corresponding to the memory access request obtained from said first detection means and reading out the memory access information corresponding to the memory access request obtained from said second detection means and control means for collating the memory access request from said second detection means with the memory access information read out from said buffer memory and controlling said transmission gates on the basis of this collation result.

9. A gateway according to claim 8, wherein said system bus of corresponding hierarchical level is connected to said processor unit through an interface.

10. A gateway according to claim 9, wherein said gate control means comprises interrupt means for performing an interrupt for selectively interrupting an operation of said processor unit on the basis of an operating state of said buffer management means.

11. A gateway according to claim 9, wherein said processor unit comprises a plurality of data processors and a subsystem bus commonly connected to said plurality of data processors through corresponding interfaces and connected to said system bus of corresponding hierarchical level.

12. A gateway according to claim 11, wherein said processor unit is connected to a cache memory through an interface.

13. A gateway according to claim 8, wherein said transmission gates have expansion gates for adding hierarchical levels.

* * * * *